R. JUDY.
WATERING TROUGH.
APPLICATION FILED JUNE 11, 1919.

1,422,986.

Patented July 18, 1922.

Inventor
Robert Judy
Foreé Rain Attys.

UNITED STATES PATENT OFFICE.

ROBERT JUDY, OF GIFFORD, ILLINOIS.

WATERING TROUGH.

1,422,986.  Specification of Letters Patent.  Patented July 18, 1922.

Application filed June 11, 1919. Serial No. 303,333.

*To all whom it may concern:*

Be it known that I, ROBERT JUDY, a citizen of the United States, residing at Gifford, in the county of Champaign and State of Illinois, have invented certain new and useful Improvements in Watering Troughs, of which the following is a specification.

My invention relates to improvements in watering troughs for animals.

One of the objects of my invention is to provide a watering trough with a float so arranged as to maintain a substantially constant level of water in the trough and protected in such manner that it cannot be affected or disturbed by the animals that are drinking from the trough.

Another object of the invention is to provide an improved valve for the purpose described.

Other, further and more particular objects of my invention will become readily apparent, to persons skilled in art, from a consideration of the following description when taken in conjunction with the drawings, wherein:—

In all the views the same reference characters are employed to indicate similar parts.

Figure 1:
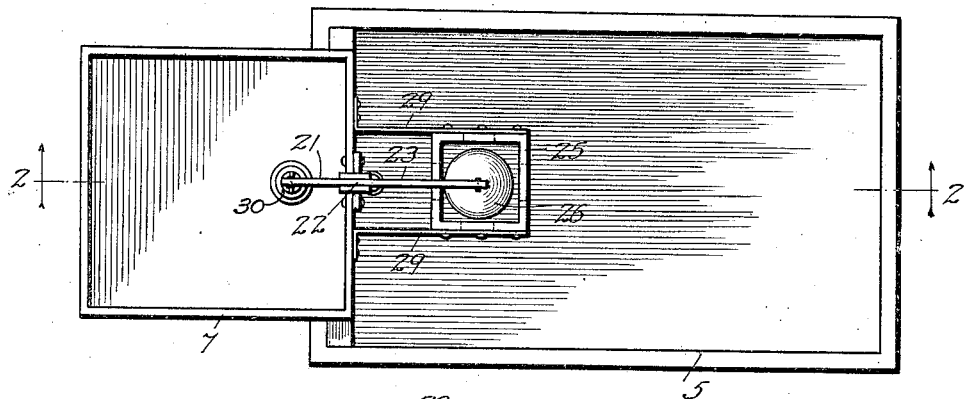
Fig. 1 is a plan view of the trough showing the water reservoir and the means for controlling the water.
Figure 2:
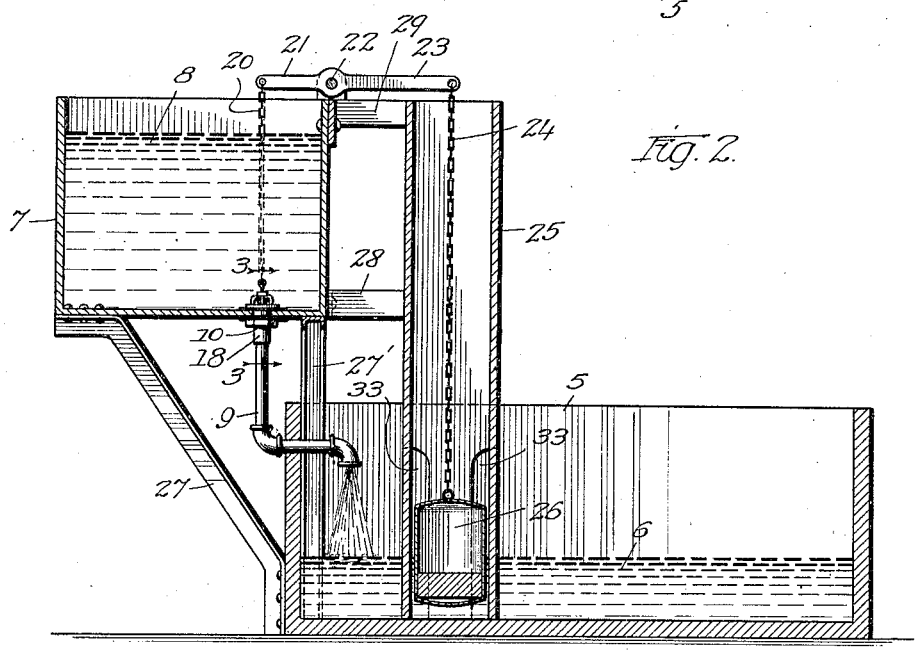
Fig. 2 is a central section thereof, taken on line 2—2 of Fig. 1.

5 is a trough or lower receptacle of any suitable kind to contain water 6, for any purpose, and more particularly for the purpose of affording drink for animals, such as cattle, horses, hogs and the like. 7 is a superposed reservoir in which water 8 is contained at a suitable head by any appropriate means. The water from the reservoir 7 is discharged into the trough 5 through a pipe 9, controlled by a valve 10. The valve consists of a vertically reciprocatable stem 11, guided in a yoke 12, and by a suitable spider 13, which moves in a cylinder or sleeve 14. The upper end of the cylinder is provided with a valve seat 15 to receive the valve 16. A nipple 18 is screwed on the end of sleeve 14, to receive the pipe 19. A chain 20 is connected to a two arm lever 21 pivoted, as at 22, to one side of the trough 7, and having an extended arm 23 to which a chain 24 is secured and which passes down through an elongated float guard 25, and is connected to the upper end of the float 26, which is adapted to move vertically in the trough 6, its altitude being regulated by the level of the water within the trough. The guard or float housing 25 is continuous and not only supplies a guide for the float 26, but is a protection for the chain 24 so that animals cannot interfere with the float or the chain and change the normal operation of the apparatus. The outer end of the reservoir 7 is connected to the trough 5 by a brace 27, and the vertical hollow guide 25 may be connected to the reservoir 7 by means of braces 28 and 29, thus making all of the parts interdependent and holding them firmly in their respective places. The operation of the device will be apparent. When the float 26 is raised by the increase of water in the tank 5, the valve 16 will descend, because it is heavier than the buoyant float, and close the valve and shut off the supply of water through the pipe 9. When the level of the water 6 descends, to a predetermined extent, in the trough 5, then the float will move downwardly and open the valve and thus constant level is maintained within the trough.

Figure 3:
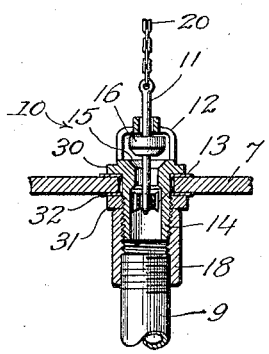
Fig. 3 is a central enlarged section taken on line 3—3 of Fig. 2.

The valve structure, shown more particularly in Fig. 3, is arranged to be secured on either side of the floor of the reservoir 7 by means of the flanged head 30 and a nut 31 which screws over the screw threaded sleeve 14, prior to placing the nipple 18 in place. Suitable gaskets or washers 32 may be employed on either side of the wall 7 to render the joint water tight.

While I have shown the guard 25 to be rectangular in cross section, it is evident that it may be circular if desired, but a rectangular form is most convenient to be made and answers every purpose. Near its lower end it is provided with apertures 33 for admission of water but which are not sufficiently large to permit disturbance of the float, by other means.

While I have herein shown a single embodiment of my invention for the purpose of clear disclosure, it is manifest that there may be changes made in the general arrangment and configuration of the parts within the scope of the appended claim.

Having described my invention, what I claim is:—

A self-contained unitary structure of the character described comprising a watering trough; a water reservoir located entirely above the trough and supported thereon; a pipe passing into the reservoir arranged to discharge water into the trough; said pipe being arranged so that water will not remain therein; a valve normally closing the upper end of said pipe; a hollow rectangular float guide structure extending from the bottom of the trough to the top of the reservoir having lateral openings through its vertical walls near its bottom end; a round, closed, cylindrical float within said guide; a lever pivoted to a proximate vertical wall of said reservoir having its outer end extending directly over the float and its inner end extending directly over the valve; a chain connecting the outer end of the lever to the float and a chain connecting the inner end of the lever to the valve whereby a straight vertical pull is made on each end of the lever in the operation of the device.

In testimony whereof I hereunto subscribe my name.

ROBERT JUDY.